United States Patent [19]

Reising et al.

[11] Patent Number: 5,795,468
[45] Date of Patent: Aug. 18, 1998

[54] IN-TANK AUTOMOTIVE FUEL FILTER

[75] Inventors: Kevin Christopher Reising, Bloomington; Timothy James Carter, Crothersville, both of Ind.

[73] Assignee: Ford Motor Company, Dearborn, Mich.

[21] Appl. No.: 828,634

[22] Filed: Mar. 31, 1997

[51] Int. Cl.⁶ .................................................. B01D 35/027
[52] U.S. Cl. ........................ 210/172; 210/232; 210/350; 210/416.4
[58] Field of Search ..................... 210/172, 350, 210/416.4, 460, 462, 463, 232, 455, 459

[56] References Cited

U.S. PATENT DOCUMENTS

| | | | |
|---|---|---|---|
| 3,826,372 | 7/1974 | Bell | 210/172 |
| 4,312,753 | 1/1982 | Bell | 210/250 |
| 4,874,510 | 10/1989 | Akira et al. | 210/172 |
| 4,966,522 | 10/1990 | Koyama | 210/172 |
| 5,049,271 | 9/1991 | Cain | 210/250 |
| 5,055,187 | 10/1991 | Ito et al. | 210/172 |
| 5,120,434 | 6/1992 | Yoshida | 210/172 |
| 5,547,568 | 8/1996 | Sasaki | 210/172 |

*Primary Examiner*—Robert Popovics
*Attorney, Agent, or Firm*—Neil P. Ferraro

[57] ABSTRACT

An in-tank fuel filter for an automotive vehicle filters fuel entering a fuel intake. The fuel filter includes a filter element and a filter manifold integrally attached to a filter frame. The filter frame is disposed within the filter element to retain the shape of the filter element. The filter frame is subsequently detached from the filter manifold thereby creating a free-floating filter frame. This allows the filter frame to move relative to the manifold so as to allow ease of insertion of the filter into the fuel tank with limited destructive deformation of the filter.

11 Claims, 3 Drawing Sheets

IN-TANK AUTOMOTIVE FUEL FILTER

FIELD OF THE INVENTION

This invention relates to automotive fuel filters, and more particularly to in-tank fuel filters.

BACKGROUND OF THE INVENTION

Conventional in-tank fuel filters are mounted to a fuel delivery module and inserted into the fuel tank of an automotive vehicle. Because the fuel filter is typically a rigid assembly attached to the fuel delivery module, if the fuel filter interferes with the tank wall upon insertion, the fuel filter may bend beyond its elastic limit and come to rest at an undesirable angle relative to the fuel level in the fuel tank. As a result, at low fuel conditions, the effective filtering area of the filter may be reduced. Accordingly, automotive assemblers must properly orient the fuel delivery module, with the fuel filter exposed thereon, in such a way as to prevent damage to the fuel filter. However, this is generally a time consuming and cumbersome task.

SUMMARY OF THE INVENTION

An object of the present invention is to provide a fuel filter which is easily installed within a fuel tank, while reducing the possibility of destructive deformation and increasing the effective filtering area of the fuel filter. This object is achieved and disadvantages of prior art approaches are overcome by providing a novel fuel filter for an automotive vehicle. The filter is disposed within the tank for filtering fuel entering a fuel intake. In one particular aspect of the invention, the fuel filter includes a filter element and a filter manifold integrally attached to a filter frame, thereby defining an attachment point. The filter frame is disposed within the filter element to retain the filter element in a predetermined shape. The filter frame is adapted for subsequent detachment from the filter manifold thereby creating a free floating filter frame disposed within the filter element. Thus, the filter frame is permitted to move relative to the manifold so as to allow insertion of the filter into the fuel tank with limited destructive deformation of the filter.

The fuel filter manifold may include an inner manifold attached to the frame and an outer manifold disposed outside of the filter element and coupled to the inner filter manifold. The inner and outer manifolds cooperate to allow fuel to flow from the filter element through the inner manifold, through the outer manifold, and into the fuel intake.

The inner manifold may include a locking tab extending from a surface thereof, and the outer manifold may include a corresponding locking tab receiving portion. The locking tab engages the receiving portion through the filter element, thereby coupling the inner manifold to the outer manifold with the filter element being sandwiched between the inner and outer manifolds. In a preferred embodiment, the attachment point between the filter frame and the manifold defines a weakened zone resulting in a high stress area to facilitate detaching of the manifold from the frame. To provide the weakened zone, the cross-sectional thickness of the attachment point is less than the cross-sectional thickness of the frame and the manifold.

An advantage of the present invention is that a low-cost fuel filter is provided having a minimum number of individual components.

Another advantage of the present invention is that assembly ease may be enhanced, which results in increased assembly speed for both assembling the individual fuel filter components and installing the filter in the fuel tank.

Yet another advantage of the present invention is that utilization of the filtering area of the filter, especially during low fuel conditions, is increased.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
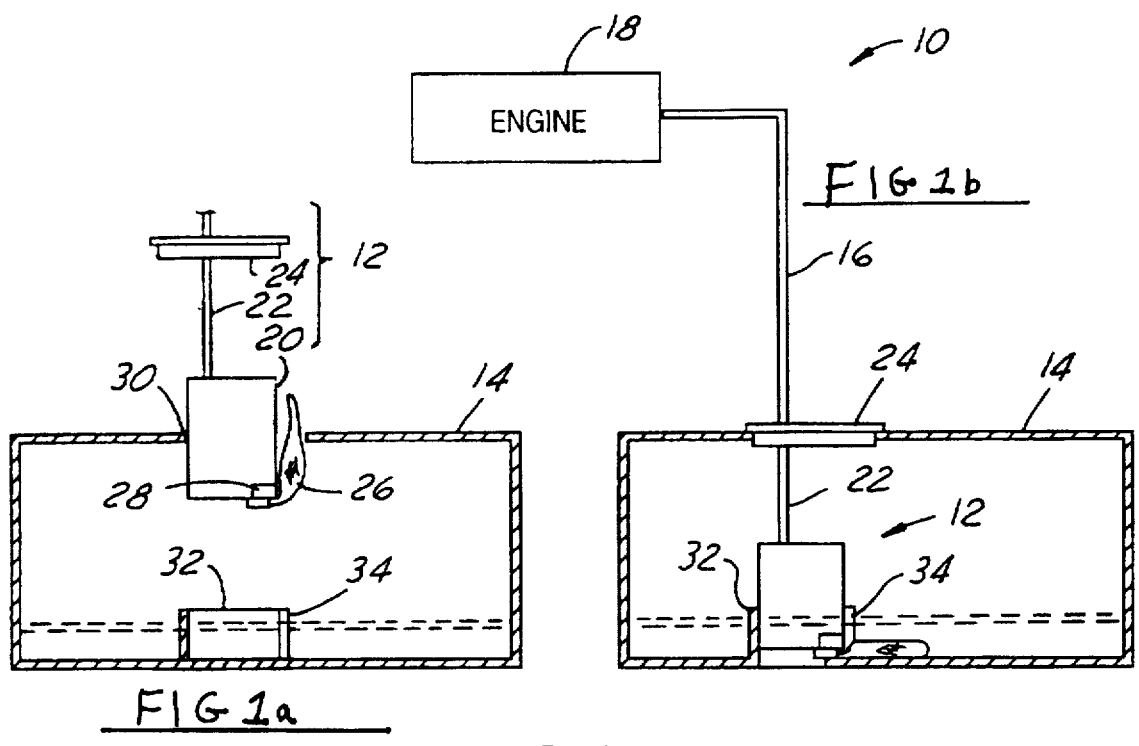
FIGS. 1a and 1b are diagrammatic representations of the insertion of a fuel filter into a fuel tank according to the present invention.
Figure 2:
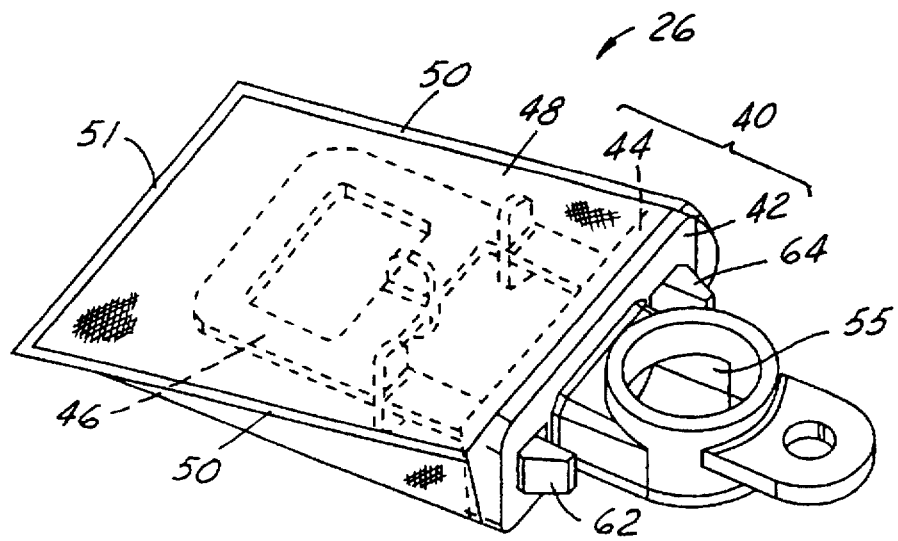
FIG. 2 is a perspective view of a fuel filter according to the present invention.

Fuel delivery system 10, shown in FIG. 1a and 1b, includes fuel delivery module 12 disposed within fuel tank 14 for supplying fuel from fuel tank 14 through fuel line 16 to engine 18. Fuel delivery module 12 includes reservoir 20, a fuel pump (not shown) disposed within reservoir 20 for pumping fuel from tank 14 to engine 18, fuel supply line 22 and fuel delivery module mounting flange 24. Fuel filter 26 is attached to fuel intake 28 of reservoir 20 such that filtered fuel may enter reservoir 20. During assembly, fuel delivery module 12 is inserted through opening 30 of fuel tank 14 (Figure 1a) and aligned within cup 32 attached to the bottom wall of fuel tank 14 for receiving and positionally locating reservoir 20. Slot 34 is formed on one side of cup 32 for receiving fuel filter 26. Once fuel delivery module 12 is installed (FIG. 1b), flange 24 is secured to the top of fuel tank 14.

According to the present invention, fuel filter 26 may flex for ease of insertion of fuel delivery module 12, together with filter 26, into fuel tank 14 and cup 32, as shown in Figure 1a. Filter 26 may then rotate to the position shown in Figure 1b. Accordingly, destructive deformation of filter 26 may be reduced and nearly complete utilization of fuel filter 26, especially at low fuel conditions, may be achieved. Fuel filter 26 may flex between the positions shown in FIG. 1a and 1b because of a free-floating frame feature, which will be further described hereinafter.

Figure 3A:
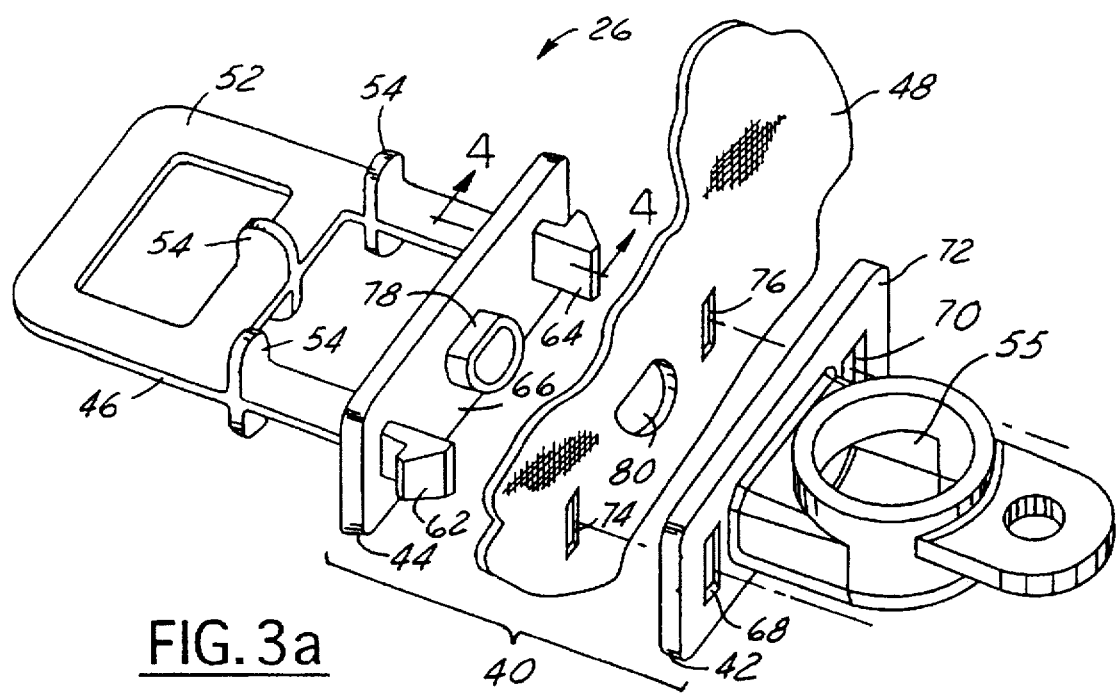
FIG. 3a is an exploded perspective view of the filter shown in FIG. 2.
Figure 3B:
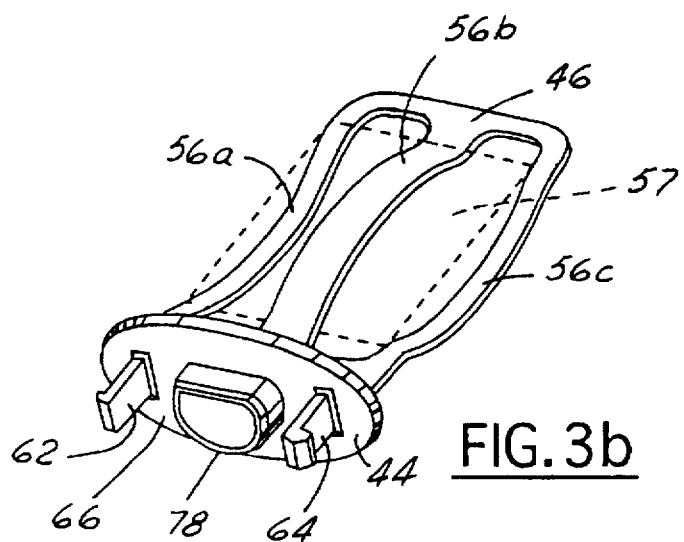
FIG. 3b is a perspective view of an alternative embodiment of a portion of the filter shown in FIG. 2.

Referring now to FIGS. 2–6, fuel filter 26 includes filter manifold 40 (having outer filter manifold 42 and inner filter manifold 44), filter frame 46 integrally molded and attached to inner filter manifold 44 at attachment point 47, and filter element 48. In a preferred embodiment, manifold 40 and filter frame 46 are formed of molded plastic. Filter element 48 is a mesh cloth which may be made from a plastic material or any other suitable material known to those skilled in the art and suggested by this disclosure. During assembly of filter 26, inner and outer manifolds 44, 42 are coupled together, as will be further explained hereinafter, with filter element 48 sandwiched therebetween. Filter element 48, which may initially comprise a sheet of mesh cloth, is then wrapped around frame 46 and inner manifold 44 and sonically welded along side edges 50 and end edge 51. Alternatively, those skilled in the art will recognize in view of this disclosure that filter element 48 may comprise a sack-like filter enveloping frame 46. As best shown in FIG. 3, filter frame 46 includes a generally planar main portion 52 lying along axis 53 and a plurality of extensions 54 extending substantially perpendicular from planar portion 52. Main portion 52 and extensions 54 cooperate to hold filter element 48 open and effectively reduce the possibility of filter element 46 collapsing when fuel is drawn through suction port 55 formed on outer manifold 42 to fuel intake 28 (see FIG. 1a). In an alternative embodiment, as shown in FIG. 3b frame 46 may be formed with bridge truss portions 56a, 56b and 56c, which extend in an alternating arrangement from plane 57, as shown. Bridge truss portions 56a, 56b and 56c cooperate in this alternating arrangement to bias filter element 48 (not shown in FIG. 3b) in a predetermined shape.

Figure 4:
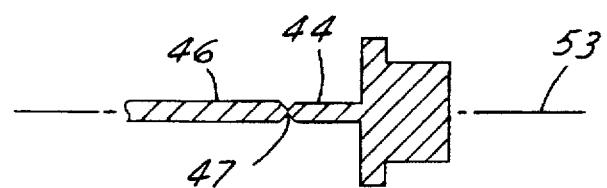
FIG. 4 is a cross-sectional view of the fuel filter taken along line 4—4 of FIG. 3.
Figure 5:
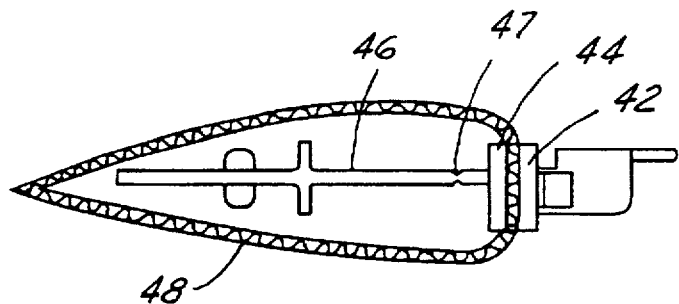
FIGS. 5 and 6 show the fuel filter before and after detaching a filter frame from a filter manifold according to the present invention; and, FIG. 7 is a side view of the filter according to the present invention.
Figure 6:
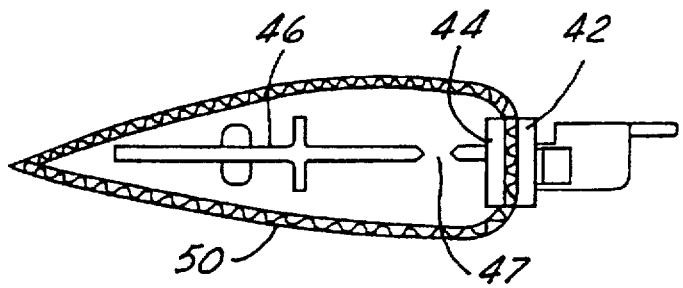
Figure 7:
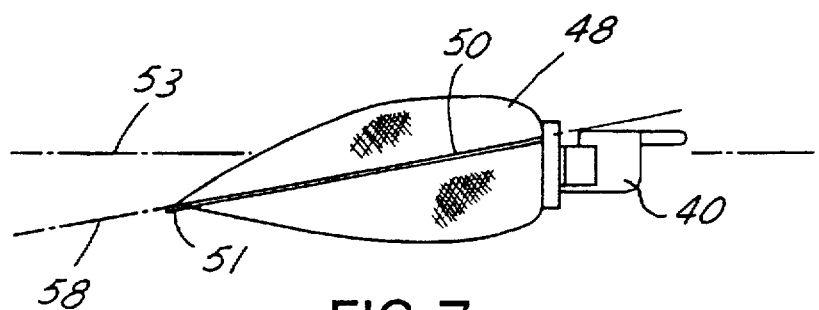

Referring now in particular to FIGS. 4–6, frame 46 is integrally molded or attached to inner manifold 44 at attachment point 47 (FIGS. 4 and 5). When filter 26 is completely assembled, frame 46 is subsequently detached from inner manifold 44 by fracturing attachment point 47, thereby creating a free-floating filter frame (FIG. 6). As a result, frame 46 may rotate relative to manifold 40 so as to allow ease of insertion of filter 26 within fuel tank 14 and cup 32, and to limit destructive deformation of fuel filter 26 upon insertion into fuel tank 14 and cup 32. If frame 46 was permanently attached to manifold 44, ease of installing fuel delivery module 12 into fuel tank 14 and cup 32 would be compromised. Also, if frame 46 was permanently attached to manifold 44 but the transition between manifold 44 and frame 46 was designed to flex, the handling and subsequent insertion of fuel delivery module 12 into tank 14 and cup 32 could cause filter 26 to assume an undesired position, which could ultimately reduce the effective filtering area of filter 26 at low fuel conditions. Further, if frame 46 were formed of a separate component from manifold 44, assembly of fuel filter 26 would be complicated because of the added number of component parts as well as the fixturing required to hold frame 46 away from edges 50 during the aforementioned sonic welding. It should be noted that frame 46 may return to the position shown in FIG. 1b, not only because of the free-floating frame feature, but also because edges 50 of filter element 48 are welded at a slight downward slope relative to frame 46. As shown in FIG. 7, the downward slope is created by welding side edges 50 such that edges 50 lie along axis 58 that intersects axis 53 of frame 46. Therefore, the filter element 48 itself biases frame 46 toward the bottom wall of tank 14.

Continuing with reference in particular to FIG. 4, attachment point 47 includes a weakened zone to facilitate detaching of the manifold 44 from frame 46. This may be accomplished by reducing the cross-sectional thickness of attachment point 47 such that it is less than the cross-sectional thickness of either frame 46 or manifold 44. Alternatively, those skilled in the art will recognize in view of this disclosure that any method may be used to form the weakened zone at attachment point 47. For example, because, in a preferred embodiment, frame 46 and manifold 40 are molded from a plastic material, the composition of the material at attachment point 47 may be altered to create a weakened zone, as desired. Further, attachment point 47 may be located at the transition between frame 46 and inner manifold 44. A sharp corner at this transition results in the aforementioned weakened zone. That is, a high stress condition exists at this sharp corner which allows frame 46 to become detached from inner manifold 44.

According to the present invention, inner manifold 44 includes a plurality of locking tabs 62, 64 extending from surface 66. Outer manifold 42 is formed with locking tab receiving portions 68, 70 formed on surface 72 for receiving locking tabs 62, 64, respectively. Further, filter element 46 is formed with openings 74, 76. To couple inner and outer manifolds 44, 42 and hold filter element 48 in place, tabs 62, 64 of inner manifold 44 pass through openings 74, 76 in filter element 48 and engage openings 68, 70 in outer manifold 42. Inner manifold 44 may also include D-shaped port 78 formed on surface 66 thereof port 78 fits into D-shaped opening 80 in filter element 48 and is received within a corresponding D-shaped opening (not shown) in outer filter manifold 42 to rotationally position inner and outer manifolds 42, 44 and filter element 48. In addition, because port 78 extends through opening 80 in filter element 48, filter element 48 is not drawn through port 58 as fuel moves through filter 26.

While the best mode in carrying out the present invention has been described in detail, those familiar with the art to which this invention relates will recognize various alternative designs and embodiments, including those mentioned above, in practicing the invention as defined by the following claims.

We claim:

1. A fuel filter for an automotive vehicle, with said filter being disposed within a fuel tank for filtering fuel entering a fuel intake, with said fuel filter comprising:

a filter element;

a filter manifold integrally attached to a filter frame, thereby defining an attachment point, with said attachment point defining a weakened zone, with said filter frame being disposed within said filter element to retain said filter element in a predetermined shape, with said filter frame being adapted for subsequent detachment from said filter manifold at said weakened zone, thereby creating a free-floating filter frame disposed within said filter element such that said filter frame is permitted to move relative to said manifold so as to allow insertion of said filter into the fuel tank with limited destructive deformation of said filter, with said weakened zone facilitating detaching of said manifold from said frame.

2. A fuel filter according to claim 1 wherein a portion of said filter manifold is disposed within said filter element, thereby defining an inner filter manifold and wherein said fuel filter further comprises an outer filter manifold disposed outside of said filter element and coupled to said inner filter manifold, with said inner and outer filter manifolds cooperating to allow fuel to flow from said filter element, through said inner manifold, through said outer manifold and into the fuel intake.

3. A fuel filter according to claim 2 wherein said inner manifold comprises a locking tab extending from a surface thereof and wherein said outer manifold comprises a corresponding locking tab receiving portion, with said locking tab engaging said receiving portion through said filter element, thereby coupling said inner manifold to said outer manifold with said filter element being sandwiched between said inner and outer manifolds.

4. A fuel filter according to claim 2 wherein said attachment point comprises a cross sectional thickness being less than a cross sectional thickness of said frame and said manifold, thereby creating said weakened zone.

5. A fuel filter according to claim 1 wherein said frame comprises a generally planar main portion having a plurality of extensions extending substantially perpendicular from said planar portion, with said main portion cooperating with said extensions to retain said filter element in said predetermined shape.

6. A fuel filter according to claim 1 wherein said frame lies generally in a plane, with said frame being formed with a plurality of bridge truss portions extending in an alternating arrangement from said plane to bias said filter element in said predetermined shape.

7. A fuel filter for an automotive vehicle, with said filter being disposed within a fuel tank for filtering fuel entering a fuel intake, with said fuel filter comprising;

a filter element;

an inner filter manifold integrally attached to a filter frame, thereby defining an attachment point, with said attachment point defining a weakened zone, with said inner manifold and said filter frame being disposed within said filter element, with said filter frame retaining said filter element in a predetermined shape;

an outer filter manifold disposed outside of said filter element and coupled to said inner filter manifold such that said filter element is sandwiched between said inner and outer manifolds, with said inner and outer filter manifolds cooperating to allow fuel to flow from said filter element, through said inner manifold, through said outer manifold and into the fuel intake;

wherein said filter frame is adapted for subsequent detachment from said inner filter manifold at said weakened zone, thereby creating a free-floating filter frame disposed within said filter element such that said filter frame is permitted to move relative to both said manifolds so as to allow insertion of said filter into the fuel tank and further limit destructive deformation of said filter, with said weakened zone facilitating detaching of said inner manifold from said frame.

8. A fuel filter according to claim 7 wherein said inner manifold comprises a locking tab extending from a surface thereof and wherein said outer manifold comprises a corresponding locking tab receiving portion, with said locking tab engaging said receiving portion through said filter element, thereby coupling said inner manifold to said outer manifold.

9. A fuel filter according to claim 7 wherein said frame comprises a generally planar main portion having a plurality of extensions extending substantially perpendicular from said planar portion, with said main portion cooperating with said extensions to retain said filter element in said predetermined shape.

10. A fuel filter according to claim 7 wherein said frame lies generally in a plane, with said frame being formed with a plurality of bridge truss portions extending in an alternating arrangement from said plane to bias said filter element in said predetermined shape.

11. A fuel filter according to claim 7 wherein said attachment point comprises a cross sectional thickness being less than a cross sectional thickness of said inner frame and said manifold, thereby creating said weakened zone.

* * * * *